United States Patent [19]
Smalley et al.

[11] Patent Number: 5,848,281
[45] Date of Patent: Dec. 8, 1998

[54] METHOD AND APPARATUS FOR POWDER MANAGEMENT IN A MULTIFUNCTION CONTROLLER WITH AN EMBEDDED MICROPROCESSOR

[76] Inventors: Kenneth George Smalley, 10 Sandra Dr., Hauppauge, N.Y. 11788; Ian Fraser Harris, 5 Geoffrey La., Kings Park, N.Y. 11754

[21] Appl. No.: 685,378

[22] Filed: Jul. 23, 1996

[51] Int. Cl.$^6$ .................................................. G06F 1/32
[52] U.S. Cl. .................... 395/750.04; 364/707; 395/556
[58] Field of Search .............................. 395/750, 750.04, 395/750.05, 556, 559; 364/707; 327/142

[56] References Cited

U.S. PATENT DOCUMENTS

| | | | |
|---|---|---|---|
| 4,851,987 | 7/1989 | Day | 364/200 |
| 5,222,239 | 6/1993 | Rosch | 395/750 |
| 5,339,446 | 8/1994 | Yamasaki et al. | 395/750 |
| 5,369,771 | 11/1994 | Gettel . | |
| 5,386,552 | 1/1995 | Garney | 395/575 |
| 5,446,906 | 8/1995 | Kardach et al. . | |
| 5,560,020 | 9/1996 | Nakatani et al. | 395/750 |

FOREIGN PATENT DOCUMENTS

| | | |
|---|---|---|
| 0 419 908 A2 | 4/1991 | European Pat. Off. . |
| 0 446 958 A2 | 9/1991 | European Pat. Off. . |
| 0 474 963 A2 | 3/1992 | European Pat. Off. . |
| 0 499 178 A1 | 8/1992 | European Pat. Off. . |
| 0 708 398 A2 | 4/1996 | European Pat. Off. . |

*Primary Examiner*—Meng-Ai T. An
*Assistant Examiner*—Rupal D. Dharia
*Attorney, Agent, or Firm*—Proskauer Rose LLP

[57] ABSTRACT

A method and apparatus for providing power management functions in a multifunction controller having an embedded microprocessor. An enter sleep mode indication is received in the microprocessor in the form of, for example, a command generated by a host central processing unit or an interrupt indicating a lack of system activity for a predetermined period of time. The clock input to the microprocessor is switched from a first clock source to a second clock source in response to the enter sleep mode indication. The main system supply may then be powered down by the microprocessor. The first clock source is then turned off after expiration of a first predetermined delay. The second clock is subsequently turned off after a second predetermined delay, to thereby place the system and the microprocessor into a sleep mode. While the system and microprocessor are in the sleep mode, an interrupt-handling portion of the microprocessor and a power control logic circuit remain powered off a low-current standby supply. Upon detection of a wake-up event, the second clock source is automatically started and applied to the microprocessor after a predetermined delay. The microprocessor can then process the wake-up event indicator, and if necessary power up the system and re-connect itself to the first clock source.

14 Claims, 6 Drawing Sheets

METHOD AND APPARATUS FOR POWDER MANAGEMENT IN A MULTIFUNCTION CONTROLLER WITH AN EMBEDDED MICROPROCESSOR

FIELD OF THE INVENTION

The present invention relates generally to power management operations performed in a microprocessor-based integrated circuit such as a multifunction controller having an embedded microprocessor. More particularly, the invention relates to techniques for using the embedded microprocessor to control the application of power in a computer or other system associated with the multifunction controller when entering and/or exiting a "sleep" mode.

BACKGROUND OF THE INVENTION

In order to minimize power consumption in a computer or other electronic system, it is often desirable to have the ability to switch off the power to certain components when the system is idle for extended periods of time. A power management circuit monitors a keyboard, mouse and other system elements for signs of activity, and shuts down a main system power supply if no activity is detected for a predetermined time period. This places the system in a standby or "sleep" mode of operation. A standby power supply is typically provided to supply power to standby logic circuitry which causes the system to exit sleep mode in response to a wake-up event such as a keyboard entry or mouse click. This standby logic circuitry may be required to operate with near zero current, on the order of 10 $\mu$A or less, when the system is in "sleep" mode of operation.

Multifunction controllers have been utilized to provide these and other power management functions in computers and other systems. A typical multifunction controller may include several independent controllers, such as a floppy disk controller, one or more serial port controllers, a parallel port controller, and a keyboard/mouse interface controller, as well as other components such as an embedded microprocessor and a real time clock (RTC). The embedded microprocessor directs the operation of one or more of the controllers, and may also provide certain power management functions for the system in which the multifunction controller is implemented. The multifunction controller can readily monitor the activity of the keyboard, mouse and other system elements for activity using well-known interrupt processing techniques.

Conventional power management techniques generally do not take full advantage of the processing capabilities offered by the multifunction controller. These techniques therefore require the multifunction controller or any other device providing power management functions to include unduly complex standby logic circuitry, resulting in increased system cost and a higher standby current. In addition, the known techniques generally do not allow the main clock to the embedded microprocessor to be shut down, and therefore do not provide optimum conservation of system power. Other problems with known power management techniques include the inability to have a system enter a low current mode and then resume execution where it left off.

As is apparent from the above, there is a need for improved power management techniques suitable for use in multifunction controllers as well as other microprocessor-based integrated circuits.

SUMMARY OF THE INVENTION

The present invention provides improved power management techniques for achieving a low standby current in a computer or other system. An illustrative embodiment utilizes an embedded microprocessor in a multifunction controller to control the main system power supply.

One aspect of the invention relates to entering a sleep mode of operation. An enter sleep mode indication is received in the microprocessor in the form of, for example, a command generated by a host central processing unit or an interrupt indicating a lack of system activity for a predetermined period of time. The clock input to the microprocessor is switched from a first clock source to a second clock source in response to the enter sleep mode indication, and the main system supply is powered down by the microprocessor. The first clock source is then turned off after expiration of a first predetermined delay. The second clock source is subsequently turned off after a second predetermined delay, to thereby place the system and the microprocessor into a sleep mode. The first clock source generally provides a precision clock signal utilized by the microprocessor under normal operating conditions, while the second clock source provides a clock with characteristics particularly well-suited for use in entering and exiting the sleep mode. For example, the second clock source may be implemented as a ring oscillator which will provide an acceptable output clock signal within a very short period of time after turn-on.

Another aspect of the invention relates to exiting the sleep mode of operation. While the system and embedded microprocessor are in the above-described sleep mode, an interrupt-handling portion of the microprocessor and a power control logic circuit remain powered by a low-current standby supply. Upon detection of one of a number of predetermined wake-up events, the second clock source is automatically re-started and applied to the microprocessor after a predetermined delay. The microprocessor can then process the wake-up event indicator, and if necessary power up the system and re-connect itself to the first clock source.

BRIEF DESCRIPTION OF THE DRAWINGS

FIGS. 5A, 5B and 5C are schematic diagrams illustrating an exemplary implementation of the power control logic circuitry of FIG. 2.

DETAILED DESCRIPTION OF THE INVENTION

The present invention will be illustrated below in conjunction with an exemplary multifunction controller having an embedded microprocessor. It should be understood, however, that the power management techniques of the present invention are more broadly applicable to a wide variety of other types of microprocessor-based systems and devices. Alternative applications for the power management techniques described herein include, for example, industrial control applications. In addition, it should be noted that the invention does not require the use of any particular type of embedded microprocessor. The term "microprocessor" as used herein is intended to include any type of processing circuit which may be utilized to provide the described power management functions. The terms "turn on" and "turn off" in the context of switching clocks, power supplies or other signals are intended to include both turning on or off the sources of the signals as well as connecting or disconnecting the signal outputs of the sources.

Figure 1:
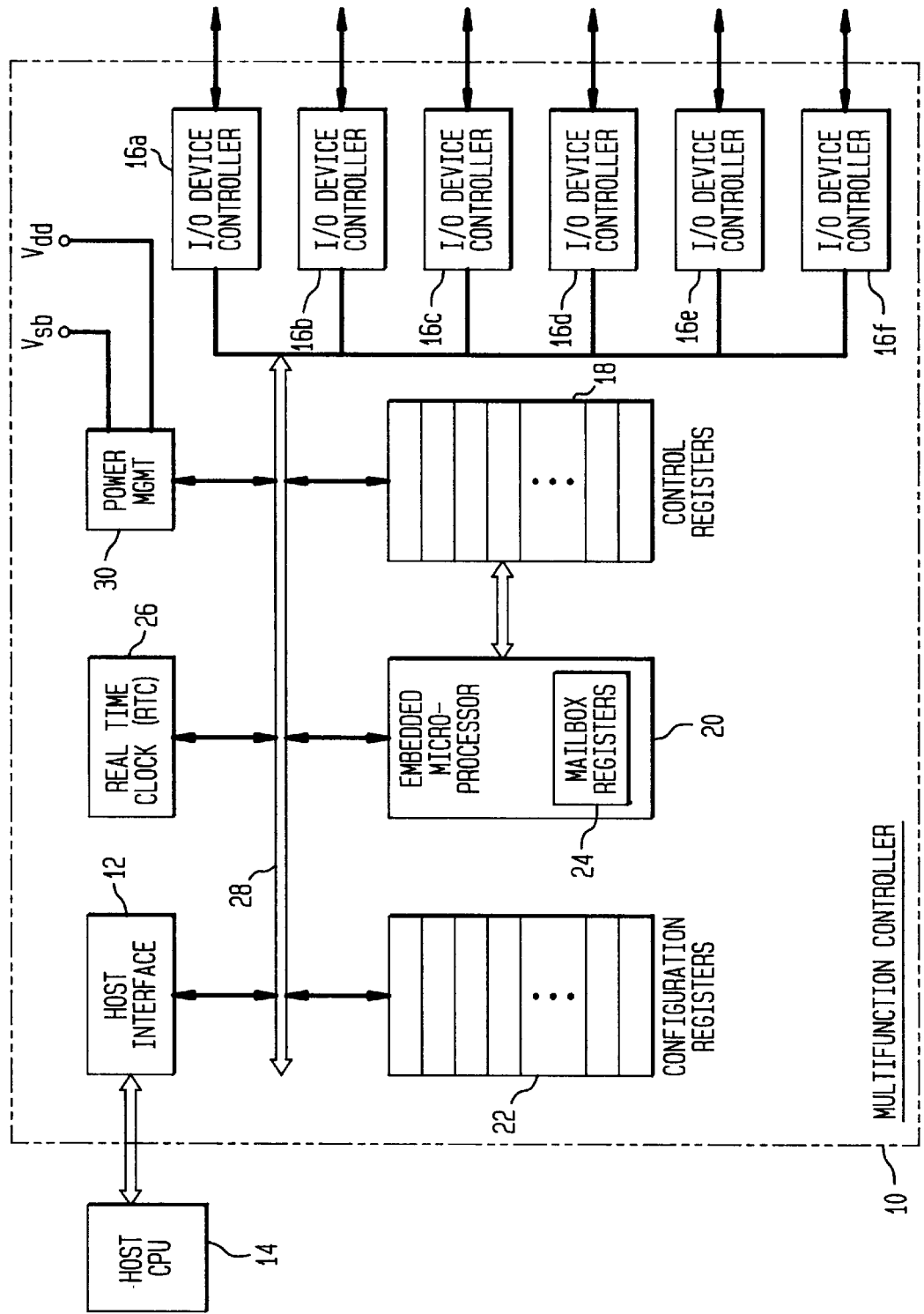
FIG. 1 is a block diagram of an exemplary multifunction controller and its interface with an external host central processing unit (CPU). The multifunction controller includes an embedded microprocessor and a power management circuit which together provide the power management features in an exemplary embodiment of the present invention.

FIG. 1 shows a block diagram of a multifunction controller 10 in which the power management techniques of the present invention may be implemented. The multifunction controller 10 includes a host interface 12 for interfacing with a host central processing unit (CPU) 14 which is external to the multifunction controller 10. The multifunction controller 10 also includes a number of independent input/output (I/O) device controllers 16a–16f. These device controllers may include a floppy disk controller, a mouse interface controller, a keyboard interface controller, a parallel port controller and several serial port controllers. The operation of the device controllers 16a–16f may be directed in accordance with information stored in a set of control registers 18. One or more of the control registers 18 are associated with each device controller 16a–16f.

The multifunction controller 10 includes an embedded microprocessor 20 which may be an 8-bit microprocessor such as the 8051 available from Intel. The operation of the 8051 microprocessor is described in greater detail in the following Intel publications: "Embedded Microcontrollers and Processors," Vol. 1, 1993; "MCS-51 Family of MicroControllers, Architectural Overview," September 1989; and "MCS-51 Programmer's Guide and Instruction Set," July 1989. The remainder of the description will assume that the embedded microprocessor 20 is an 8051 microprocessor, although as noted above the present invention does not require the use of any particular microprocessor.

The embedded microprocessor 20 directs the operation of the control registers 18, which in turn direct the operation of the I/O device controllers 16a to 16f. The control registers 18 form at least part of the address space of the embedded microprocessor 20. This control register address space may be on the order of 64 k bytes. The embedded processor 20 also operates in conjunction with power management circuitry to control certain aspects of power management in accordance with the present invention. As will be described in greater detail below, an 8051 microprocessor is able to enter an IDLE mode of operation during which it stops executing instructions and turns off the clock to its internal CPU, but continues to supply the clock to its interrupt, timer and I/O functions. The internal CPU status may be preserved in its entirety, including the status of all internal registers. When an 8051 microprocessor is in its IDLE mode, its primary clock source may be switched off or otherwise disconnected without causing any operational problems. The IDLE mode of the 8051 microprocessor may be terminated by using either an enabled interrupt condition or a hardware reset. Although it will be apparent that these features of the 8051 processor make it well-suited for use with the present invention, it should again be emphasized that these embedded microprocessor features are not required to practice the invention.

The multifunction controller 10 further includes a set of configuration registers 22. The configuration registers 22 are shown as a single unit in FIG. 1 for clarity of illustration. However, it should be noted that these configuration registers may represent different portions of one or more random access memory (RAM) devices, portions of data or program read-only memory (ROM), as well as various other registers associated with the embedded microprocessor 20. The address space represented by the configuration registers 22 may be on the order of 256 bytes. Also associated with the embedded microprocessor 20 is a set of mailbox registers 24. The mailbox registers 24 may be internal to the embedded microprocessor 20 as in the embodiment of FIG. 1 or external to the embedded microprocessor 20 in alternative embodiments. The mailbox registers 24 are typically utilized to enable the host CPU 14 to access the control registers 18. U.S. patent application Ser. No. 08/661,128 of Steven Burstein, Ian F. Harris and Kenneth G. Smalley, entitled "Bridge Mode" and assigned to the assignee of the present invention, discloses a technique which allows the host CPU 14 to directly access the control registers 18 without intervention of the embedded microprocessor 20. The disclosure of this application is incorporated herein by reference.

Other elements of the multifunction controller 10 include a real time clock (RTC) circuit 26 which generates timing signals for the multifunction controller, and a power management circuit 30 the operation of which will be described in greater detail below. The host interface 12, control registers 18, embedded microprocessor 20, configuration registers 22, RTC 26 and power management circuit 30 are all interconnected by a bus structure 50. The multifunction controller 10 may also include a number of other devices not shown in FIG. 1, such as a flash interface and a pulse width modulator.

The present invention provides improved power management techniques which may be implemented in the exemplary multifunction controller of FIG. 1 using the embedded microprocessor 20 and the power management circuit 30. As shown in FIG. 1, the power management circuit 30 is connected to the main power supply Vdd of the computer or other electronic system in which the multifunction controller 10 is installed. The power management circuit 30 controls application of the main power supply Vdd to the other elements of the controller 10 and the system in which it is installed. The power management circuit 30 is also connected to a standby power supply Vsb which may be a battery back-up supply or other low-current supply. The power management circuit 30 operates to place portions of the multifunction controller 10 into a standby or "sleep" mode in response to certain system conditions, such as a lack of keyboard or mouse activity for a predetermined period of time. During sleep mode, power is conserved by turning off the main power supply Vdd or otherwise disconnecting Vdd from most current-consuming elements of the multifunction controller 10 and the system in which it is installed. The power management circuit 30 and any I/O device controllers 16a–16f required to wake up the controller 10 and the corresponding system remain powered by the standby supply Vsb. For example, in a computer system in which a wake-up event may be triggered by clicking the mouse or pressing any key on the keyboard, the I/O device controllers 16a–16f corresponding to the mouse and keyboard should remain powered off the Vsb supply such that the wake-up signals can be supplied to the power management circuit 30.

Figure 2:
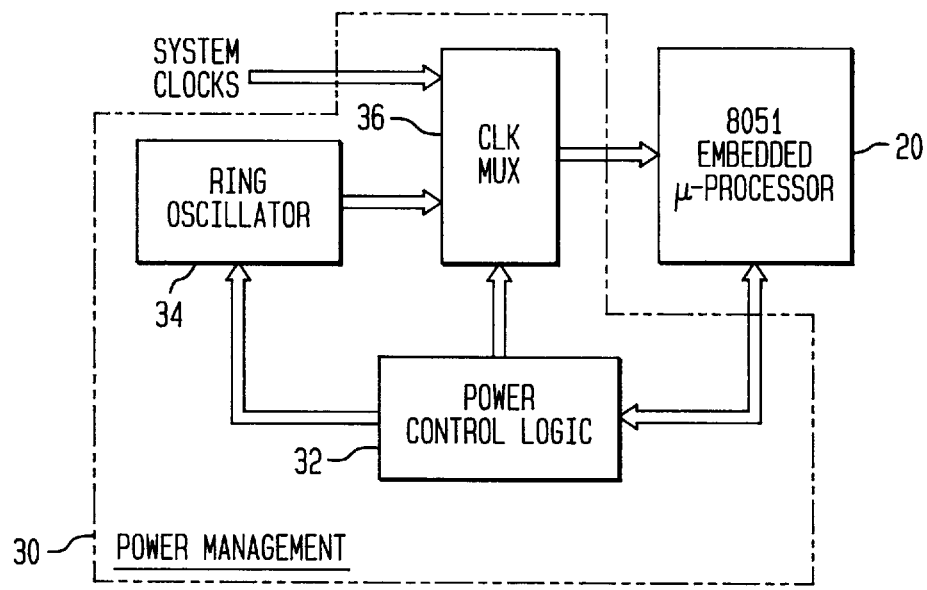
FIG. 2 Is a more detailed block diagram of the power management circuit of FIG. 1 in accordance with the present invention.

FIG. 2 shows a more detailed block diagram of an exemplary embodiment of the power management circuit 30 in accordance with present invention. The power management circuit 30 includes power control logic 32 which interacts with the embedded microprocessor 20 and controls the operation of a ring oscillator 34. The ring oscillator provides a clock output to a clock multiplexer which supplies either the ring oscillator clock or one or more system clocks to the embedded microprocessor 20. The power control logic 32, ring oscillator 34 and clock multiplexer 36 are powered off the standby supply Vsb. These elements are therefore available at all times to process wake-up events received after the remainder of the controller 10 and its corresponding system are placed in sleep mode by turning off or otherwise disconnecting the main supply Vdd.

Figure 3:
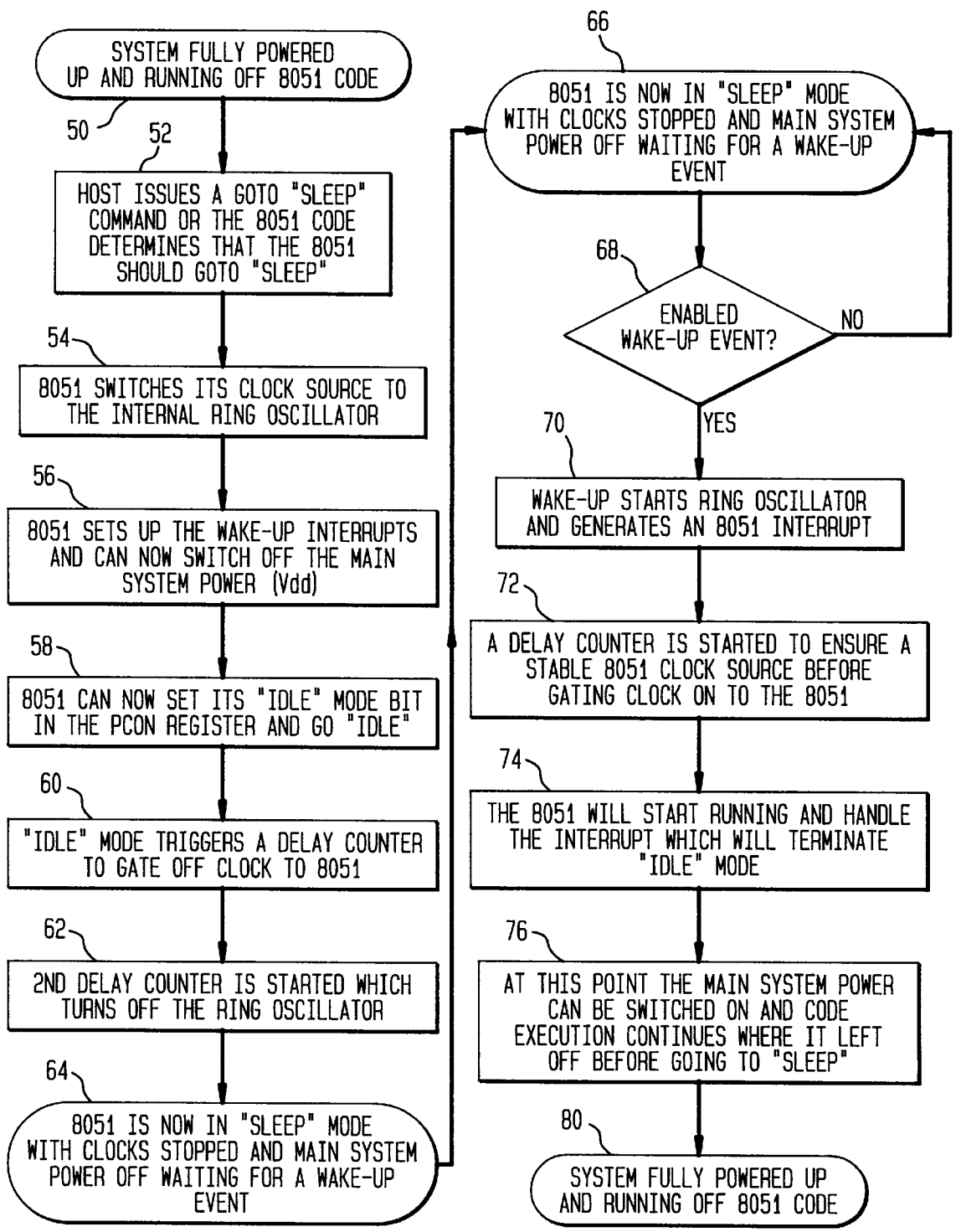
FIG. 3 is a flow diagram illustrating exemplary power management operations in accordance with the present invention.

FIG. 3 is a flow diagram which illustrates the operation of the exemplary power management circuit 30 of FIG. 2. Steps 50 through 64 illustrate the manner in which the multifunction controller 10 enters a sleep mode. In step 50, the system in which the multifunction controller 10 is installed is fully powered and the embedded microprocessor 20 is executing instruction code in a conventional manner. The host CPU 14 then issues a command to enter sleep mode in step 52. Alternatively, the microprocessor 20 could independently determine that it should enter a sleep mode. This determination could be based on, for example, expiration of a predetermined time period without certain types of I/O activity. In either case, the microprocessor 20 in step 54 sends a signal to the power control logic 32 which directs the clock multiplexer 36 to switch the primary clock source for the microprocessor 20 to the clock generated by the ring oscillator 34. The microprocessor 20 in step 56 sets up a number of wake-up interrupts which are indicative of various wake-up events which the microprocessor will look for during sleep mode. As noted above, these wake-up events may include keyboard or mouse activity. The microprocessor 20 can then issue a command directing that the main power supply Vdd be turned off or otherwise disconnected. The microprocessor 20 then enters the previously-described IDLE mode in step 58 by setting the appropriate bit in its internal PCON register.

The entry of IDLE mode triggers a reset of a first delay counter in step 60. The expiration of a predetermined first delay count causes the primary clock to the microprocessor 20 to be turned off or otherwise disconnected from the microprocessor 20. This first delay ensures that the microprocessor 20 has sufficient time to complete execution of any in-process instructions and to stabilize its internal signals. In step 62, a second delay counter is started to time the turn-off of the ring oscillator. This second delay counter may share portions of the first delay counter circuitry, and a reset of the predetermined second delay count may also be triggered by entry of the IDLE mode. The expiration of the second delay count causes the ring oscillator 34 to be turned off. The first and second delay counts provide a sequenced turn-off of the primary clock and ring oscillator clocks which ensure that the microprocessor 20 will wake up properly. As indicated in step 64, the embedded processor 20 is now in sleep mode, with its primary system clock and the ring oscillator clock turned off, and the main system power supply Vdd turned off. As noted above, the IDLE mode of the 8051 microprocessor allows the internal CPU state to be preserved while its primary clock source is disconnected. Certain portions of the microprocessor 20 remain powered off the standby supply Vsb such that a wake-up event originating from the keyboard, mouse or other peripheral controlled by controller 10 can be detected by the microprocessor 20 and power management circuit 30.

Steps 66 through 80 of FIG. 3 illustrate the manner in which the multifunction controller 10 exits a sleep mode. In step 68, a decision is made as to whether an enabled wake-up event has occurred. The enabled wake-up events will include those events for which the microprocessor 20 had previously established unmasked interrupts in the above-described step 56, as well as any other wake-up events which can be monitored by the microprocessor 20 in the sleep mode. The occurrence of an enabled wake-up event will cause the power control logic 32 to restart the ring oscillator 34 and to generate an interrupt to the microprocessor 20, as shown in step 70. A third delay counter is then started in step 72. The expiration of a third predetermined delay count will cause the primary clock source to be reapplied to the microprocessor 20. This third delay count ensures that the ring oscillator has sufficient time to stabilize before it is reapplied to the microprocessor 20. In step 74, the microprocessor begins running with the supplied ring oscillator clock source, and processes the interrupt generated in step 70 to thereby terminate its IDLE mode of operation.

At this point, step 76 indicates that the main system power supply Vdd may be switched back on, the clock source to the microprocessor 20 can be switched back from the ring oscillator source to the primary clock source, and code execution in the microprocessor 20 continues where it left off prior to entry of the sleep mode. The system is then fully powered and running off the code executed in microprocessor 20, as shown in step 80. It should be noted that all wake-up events need not result in the microprocessor 20 turning on system power and reconnecting the primary clock source. For example, if the microprocessor 20 operating with the ring oscillator clock determines that a particular wake-up event does not necessitate powering up the system, the microprocessor 20 could put itself back to sleep by entering the IDLE mode. This would trigger the second delay counter, resulting in the eventual turn-off of the ring oscillator, such that the microprocessor 20 is returned to sleep mode and the rest of the system remains in sleep mode.

Figure 4:
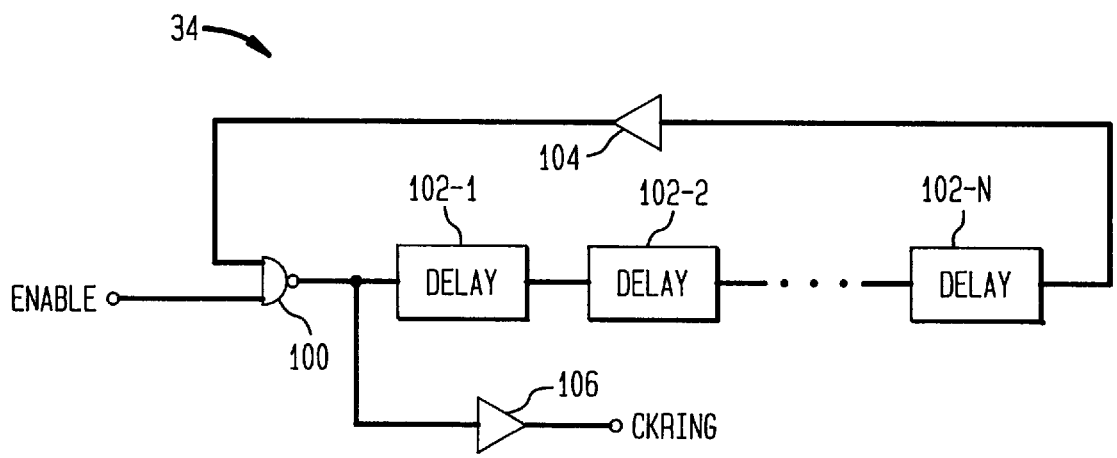
FIG. 4 is a schematic diagram of an exemplary ring oscillator suitable for use in the power management circuit of FIG. 2.

FIG. 4 is a schematic diagram of an exemplary ring oscillator 34 suitable for use in the power management circuit 30 of FIG. 2. The ring oscillator 34 includes a NAND gate 100 which receives on a first input an ENABLE signal from the power control logic. The output of the NAND gate 100 is applied to a serial arrangement of delay elements 102-1, 102-2, . . . 102-N which provide a predetermined amount of delay to the NAND gate output. The delayed output is fed back to another input of the NAND gate 100 via a buffer 104. The output of the NAND gate 100 is also applied to a buffer 106. The output of the buffer 106 represents the ring oscillator output clock signal CKRING which is supplied to the clock multiplexer 36 of FIG. 2. The ring oscillator is particularly well-suited for use with the present invention in that it is able to start up and operate at its designated frequency within a very short period of time. In addition, the ring oscillator 34 can be readily implemented using well-known complementary metal-oxide-semiconductor (CMOS) processes. Because the ring oscillator 34 is not crystal-based or phase-locked, its output clock frequency may vary with temperature, voltage, processing variations and other factors. These variations will generally not result in degradations in the above-described sleep mode entry and exit processes.

The number and delay characteristics of the delay elements 102 will determine the frequency of the ring oscillator clock. In an exemplary embodiment, the delay elements 102 may be configured with a total delay on the order of 100 to 200 nsec in order to provide an output clock frequency on the order of 5 to 6 MHz. Slower oscillator clock frequencies could be used in alternative embodiments, but would generally result in slowing down the entry and exit of sleep mode. Higher oscillator clock frequencies could also be used, but the maximum oscillator clock frequency should generally not exceed the operating clock frequency of the embedded microprocessor 20. The exemplary 8051 microprocessor described above generally operates with clock frequencies between 12 MHz and 16 MHz, such that the above-noted ring oscillator output clock frequency on the order of 5 to 6 MHz provides acceptable performance. It should be noted that any number of alternative oscillators or other types of clock sources may be used in place of the ring oscillator 34. However, crystal oscillators are generally not preferred in most applications in that such oscillators may take up to 10 ms or longer to begin supplying an adequate clock output signal. This would unduly slow down the entry and exit of sleep mode.

Figure 5B:
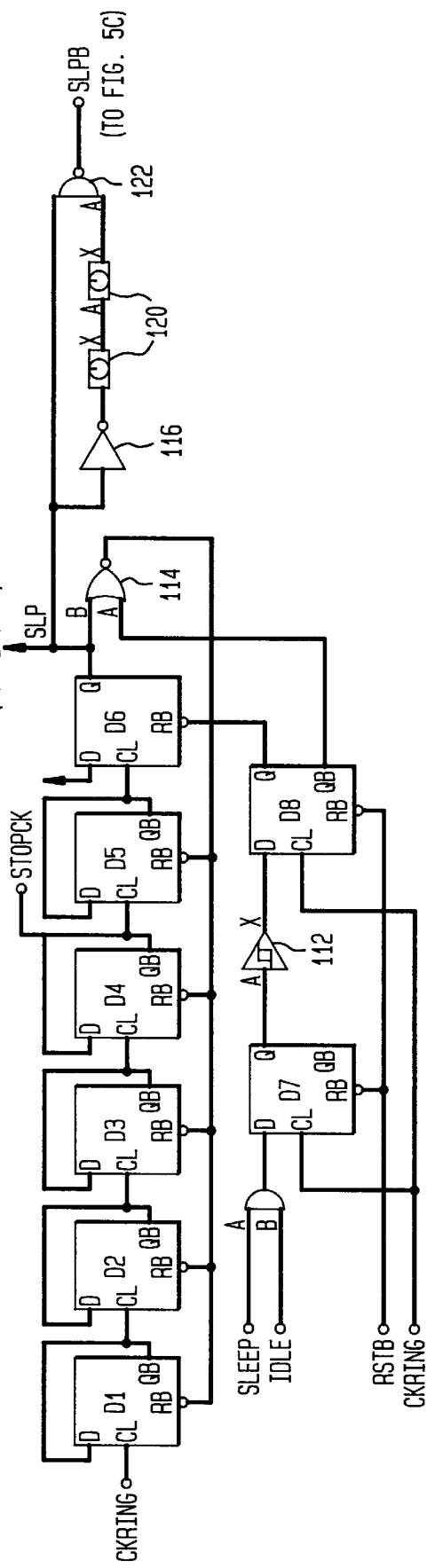
Figure 5B:
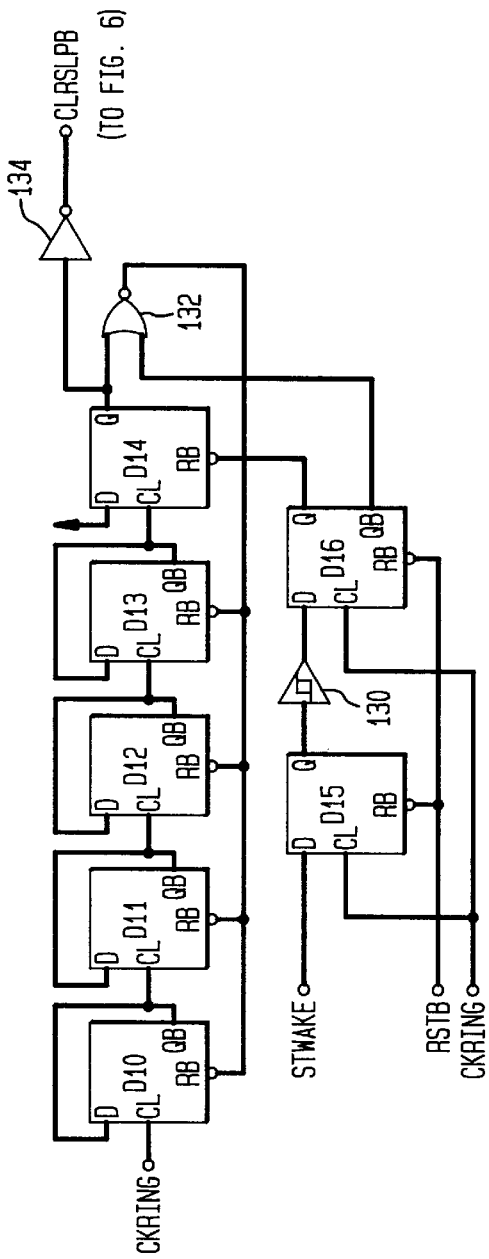
Figure 5C:
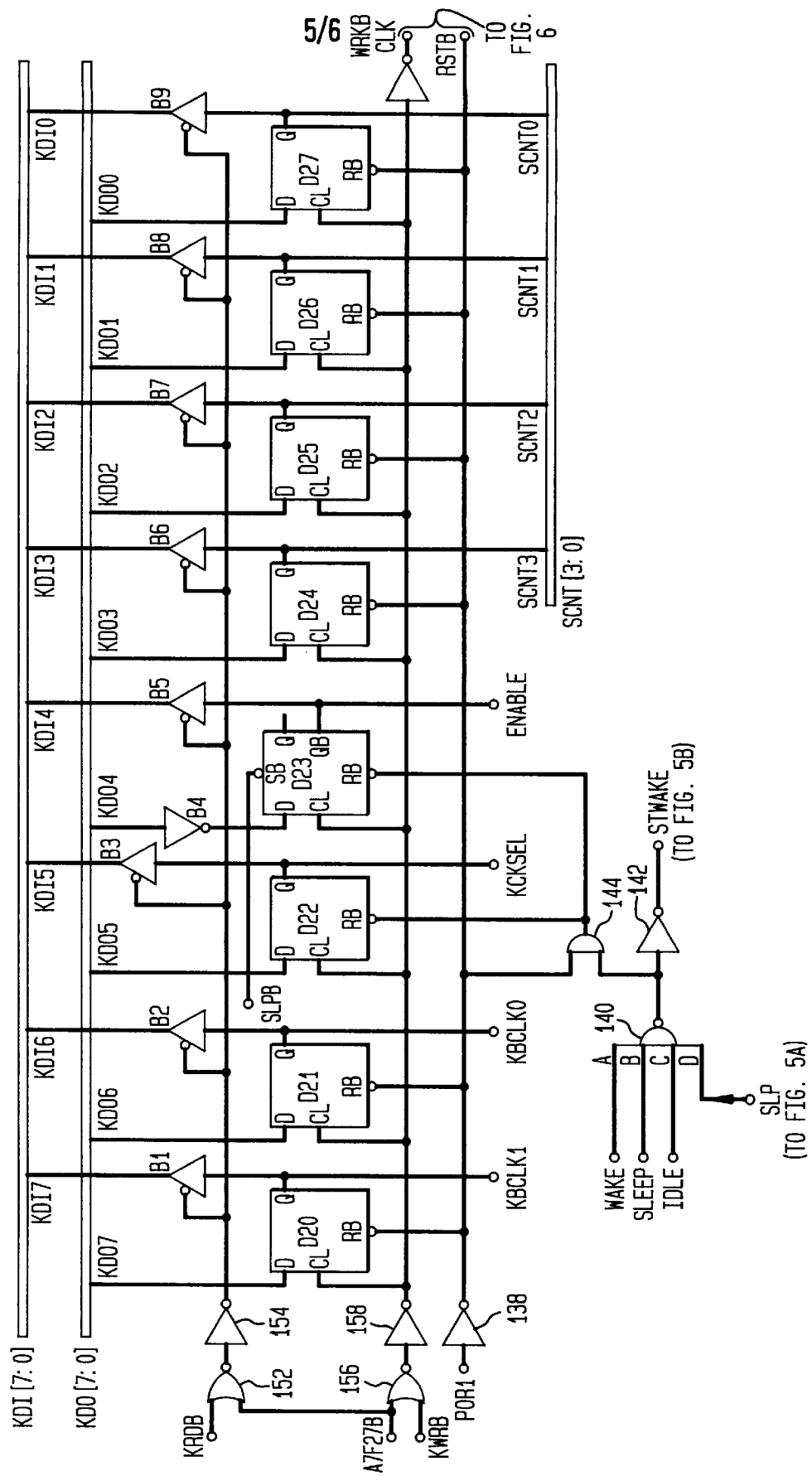

FIGS. 5A–5C show schematic diagrams of portions of the power control logic 32 of FIG. 2. FIG. 5A shows a first delay counter circuit which generates a signal used for turning off the primary clock to the embedded microprocessor 20 as described in conjunction with step 60 of FIG. 3. The first delay counter circuit includes a group of serially-connected D-type flip-flops D1–D6 which serve to count cycles of the input clock CKRING from the ring oscillator 34. The QB output of the fourth D-type flip-flop D4 is a signal STPCK which is used in the circuit of FIG. 6 to turn off the clock to the embedded microprocessor 20. The first delay used to shut off the primary clock to the microprocessor 20 is thus 18 cycles of the ring oscillator clock CKRING after the embedded microprocessor 20 enters IDLE mode. At a ring oscillator clock frequency of 5 MHz, this represents a delay of 3.6 μsec. As noted above, this delay ensures that the microprocessor 20 has finished executing code and that its internal signals have stabilized. The resetting of the flip-flops D1–D6 is controlled using signals SLEEP and IDLE which are supplied to inputs of an AND gate 110. The signal SLEEP is high after an indication is received that the system is to enter a sleep mode of operation, as described in conjunction with step 52 of FIG. 3. The signal IDLE is high when the embedded microprocessor 20 enters an IDLE mode as described in conjunction with step 58 of FIG. 3. The entry of IDLE mode is thus used to control the reset of the first delay counter via flip-flops D7 and D8, Schmitt trigger device 112 and NOR gate 114. The flip-flops D7 and D8 in conjunction with Schmitt trigger device 112 operate as a synchronizer circuit for synchronizing the asynchronous SLEEP and IDLE signals with the CKRING clock signal. It should be noted that other microprocessor modes could be used to trigger the first delay counter in accordance with the present invention.

The circuit of FIG. 5A also provides the second delay counter function which controls the turn-off of the ring oscillator 34 as described in conjunction with step 62 of FIG. 3 above. The flip-flops D5 and D6 of FIG. 5A provide an additional delay of 16 clock cycles of the CKRING signal before generating an output signal SLP. The output signal SLP is used to turn off the ring oscillator clock signal CKRING by operating in conjunction with other logic circuitry, shown in FIG. 5C, to bring the ENABLE signal input of the ring oscillator 34 to a logic low level. The signal SLP is also applied via NOR gate 114 to the reset inputs of the flip-flops D1–D6. A signal SLPB representing a complemented and pulse-width controlled version of the signal SLP is generated using inverter 116, delay elements 120 and NAND gate 122. The signal SLPB is supplied to the circuit of FIG. 5C.

FIG. 5B shows a circuit which may be used to provide the third delay counter referred to in step 72 of FIG. 3 above.

The output of the third delay counter is a signal CLRSLPB which is applied to the clock multiplexer 36 to re-connect the main system clock source to the embedded microprocessor 20. The circuit of FIG. 5B includes a group of serially-connected D-type flip-flops D10–D14 which serve to count cycles of the ring oscillator clock CKRING. The flip-flops D10–D14 are reset to start the counting process using a STWAKE signal which is at a logic high level after receipt of a wake-up event indication. Flip-flops D15 and D16 in conjunction with NOR gate 132 are also used to control the reset function, such that a total delay of 18 cycles of the CKRING signal are counted before the signal CLRSLPB is generated. At a CKRING frequency of 5 MHz, this provides a total turn-on delay for the microprocessor clock source on the order of 3.6 μsec. As noted above, this delay ensures that the main microprocessor clock source has a chance to stabilize before its output is applied to the microprocessor 20.

FIG. 5C shows an additional portion of the power control circuit 32. The circuit of FIG. 5C includes a plurality of D-type flip-flops D20 through D27 which in conjunction with buffers B1 through B9 receive data from a set of bus lines designated KDO[7:0] and provide data to a set of bus lines designated KDI[7:0]. These sets of bus lines may be part of the multifunction controller bus structure 28 illustrated in FIG. 1. The flip-flops D20–D27 are reset via a power-on reset signal POR1 which also corresponds to the reset signal RSTB utilized in FIGS. 5A, 5B and 6. The above-described signals SLEEP and IDLE are supplied along with the signals WAKE and SLP as inputs to a NAND gate 140. The signal WAKE is generally indicative of the presence of a wake-up event. The output of the NAND gate 140 is inverted in inverter 142 to provide the signal STWAKE utilized to trigger the third delay counter circuit of FIG. 5B. The output of the flip-flop D23 represents the ENABLE signal which is applied to the input of the ring oscillator 34 as shown in FIG. 4 above. The signal SLPB described above is applied to the set input of the flip-flop D23 to cause the QB output of D23 to go to a logic low level, thereby turning off the ring oscillator 34.

Figure 6:
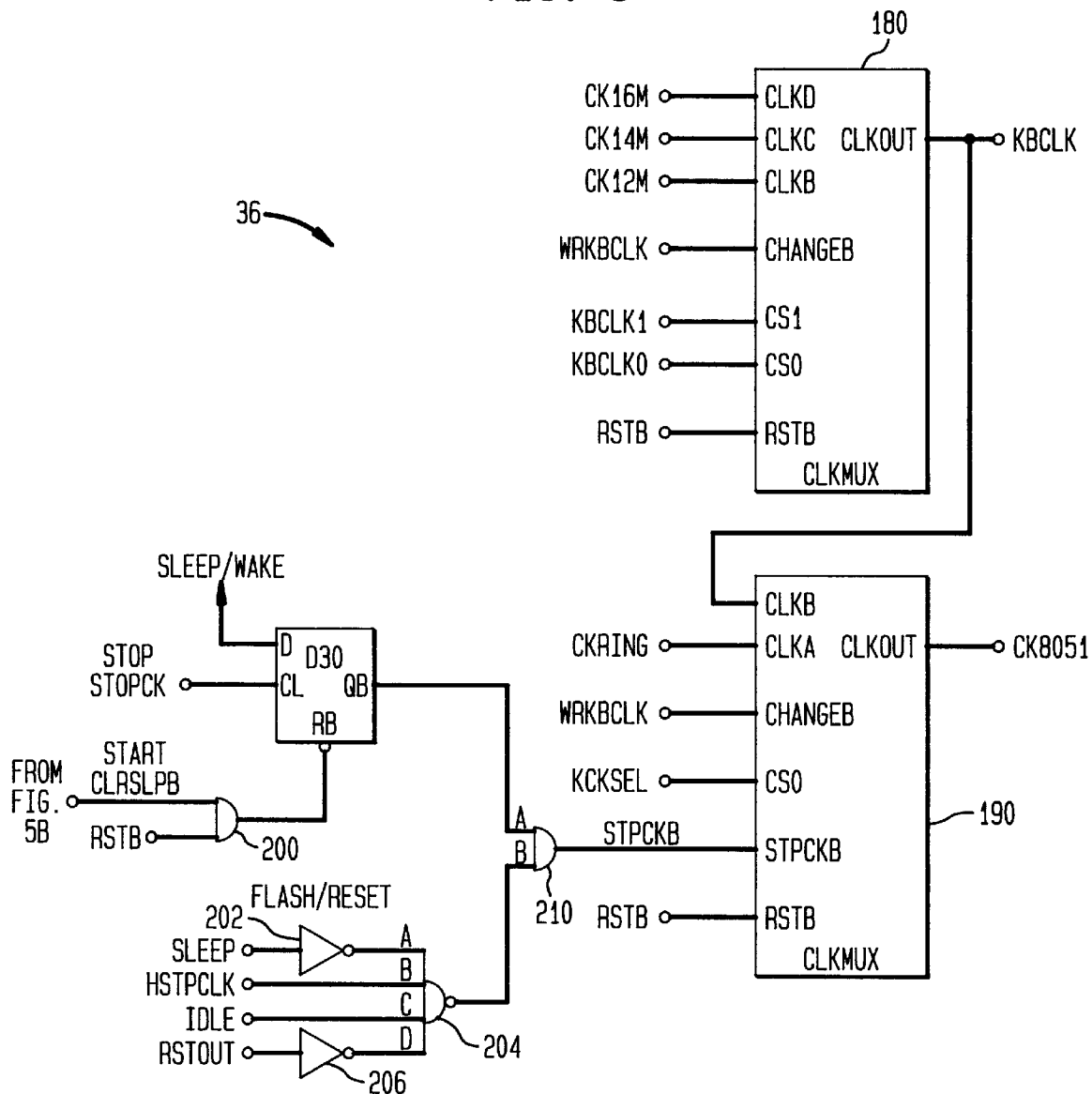
FIG. 6 is a schematic diagram of an exemplary clock multiplexer circuit suitable for use in the power management circuit of FIG. 2.

The flip-flops D20 and D21 provide as outputs the signals KBCLK1 and KBCLK0, respectively, which are applied as select signal inputs to the clock multiplexer 36 of FIG. 6. As will be described below, these signals provide a 2-bit indicator which selects one of three possible main system clock frequencies for the embedded microprocessor 20. The flip-flop D22 provides an output signal KCKSEL which is applied to the clock multiplexer 36 of FIG. 6 to select either the ring oscillator clock CKRING or a selected one of the main system clocks to be provided to the microprocessor 20. The flip-flops D22 and D23 are reset by the output of the NAND gate 140 as applied through an AND gate 144 which receives as its other input signal the above-noted POR1 signal. The flip-flops D20, D21, D22 and D23 may be written to and read from in a conventional manner via the buses KDI[7:0] and KDO[7:0], using clock and enable signals applied to gates 152, 154, 156 and 158.

FIG. 6 is a schematic diagram of the clock multiplexer 36 of FIG. 2. The multiplexer 36 includes a first multiplexer 180 and a second multiplexer 190. The first multiplexer 180 provides as an output a selected one of three input system clocks CK12M, CK14M and CK16M. The select signals are the signals KBCLK1 and KBCLK0 supplied from flip-flops D20 and D21, respectively, of FIG. 5C. These signals provide a 2-bit indication specifying one of the three input system clocks which will be used by the embedded microprocessor 20 under normal operation. The second multiplexer 190 receives as inputs the output of the first multiplexer 180 and the output CKRING of the ring oscillator 34. The output of the multiplexer 190 represents the clock applied to the embedded microprocessor 20. The multiplexers 180 and 190 each receive a signal WRKBCLK from the circuit of FIG. 5C. The WRKBCLK signal serves to latch new select values into the multiplexer when the corresponding select signals are altered.

The clock multiplexer 36 includes an AND gate 200 which receives as inputs the above-described CLRSLPB signal from the circuit of FIG. 5B, and the RSTB signal from FIG. 5C. The output of AND gate 200 resets a D-type flip-flop D30 which receives as its clock input the signal STOPCK generated at the output of D4 of FIG. 5A. The multiplexer 36 also includes an AND gate 204 which receives as inputs an inverted version of the SLEEP signal via inverter 202, an HSTPCLK signal supplied from a host stop clock register in the control registers 18, the IDLE signal, and a RSTOUT signal from reset control logic in the controller 10 via inverter 206. The multiplexer 190 includes as select signals the signal STPCKB received from the AND gate 210, and the signal KCKSEL supplied by the flip-flop D22 of FIG. 5C. These signals are used to select either the ring oscillator clock CKRING or a predetermined one of the main system clocks for application to the microprocessor 20 in accordance with the process described in conjunction with FIG. 3 above.

A power management circuit in accordance with the present invention may provide other power management functions in addition to those described above. A number of exemplary power management functions suitable for use in conjunction with the present invention are described in U.S. patent application Ser. No. 08/541,642 of Jeffrey C. Dunnihoo entitled "Process and Apparatus for Generating Power Management Events in a Computer System," and U.S. patent application Ser. No. 08/685,371 of Jay D. Popper and Richard E. Wahler entitled "Method and Apparatus for Power Supply Switching with Logic Integrity Protection," both of which are assigned to the present assignee and incorporated by reference herein.

It should be understood that the foregoing description is merely illustrative of the invention. Numerous alternative embodiments within the scope of the appended claims will be apparent to those of ordinary skill in the art.

What is claimed is:

1. A method of controlling a power source in an electronic system including a multifunction controller with an embedded microprocessor, the method including the steps of:

detecting an enter sleep mode indication;

switching a clock input of the microprocessor from a first clock source to a second clock source in response to the enter sleep mode indication, wherein said second clock source includes a ring oscillator and has a lower power consumption level than said first clock source, wherein said second clock source being separately and independently operable from said first clock source, and wherein said second clock source being powered by a standby power supply and said first clock source being powered by a main power supply, such that said standby power supply has a lower current output than said main power supply;

turning off the first clock source after expiration of a first predetermined delay to ensure that said microprocessor substantially completes in-process operations; and turning off the second clock source after expiration of a second predetermined delay, such that the embedded microprocessor enters said sleep mode.

2. The method of claim 1 wherein the first clock source provides a clock signal utilized under normal operating conditions prior to detection of the sleep mode indication.

3. The method of claim 1 wherein the step of detecting an enter sleep mode indication further includes the step of a detecting an enter sleep mode command generated by a host central processing unit in the electronic system.

4. The method of claim 1 wherein the step of detecting an enter sleep mode indication further includes the step of the embedded microprocessor detecting an absence of one or more types of system activity for a predetermined period of time.

5. The method of claim 1 further including the steps of:

detecting a wake-up event indication;

turning on the second clock source; and applying the output of the second clock source to the clock input of the microprocessor after a third predetermined delay.

6. The method of claim 5 further including the step of generating an interrupt to the embedded microprocessor after detecting the wake-up event indication.

7. The method of claim 5 further including the steps of:

turning on the system power source; and switching a clock input of the microprocessor from the second clock source to the first clock source.

8. An apparatus for controlling a power source in an electronic system including a multifunction controller with an embedded microprocessor, the embedded microprocessor normally operating with a first clock signal supplied from a first clock source, the apparatus comprising:

a second clock source having an output corresponding to a second clock signal, wherein said second clock source includes a ring oscillator and has a lower power consumption level than said first clock source, wherein said second clock source being separately and independently operable from said first clock source, and wherein said second clock source being powered by a standby power supply and said first clock source being powered by a main power supply, such that said standby power supply has a lower current output than said main power supply;

a power control logic circuit having an input connected to receive an enter sleep mode indication from the microprocessor; and a clock multiplexer having a first signal input coupled to an output of the first clock source, a second signal input coupled to the output of the second clock source, a select signal input coupled to an output of the power control logic circuit, and an output corresponding to a selected one of the first and second clock signals, wherein the clock multiplexer is operative to switch a clock input of the microprocessor from the first clock signal to the second clock signal in response to the enter sleep mode indication, wherein the power control logic circuit is operative to turn off the first and second clock sources after expiration of respective first and second predetermined delays, such that the embedded microprocessor enters said sleep mode.

9. The apparatus of claim 8 wherein the enter sleep mode indication includes an enter sleep mode command generated by a host central processing unit in the electronic system.

10. The apparatus of claim 8 wherein the enter sleep mode indication includes a signal indicative of an absence of one or more types of system activity for a predetermined period of time.

11. The apparatus of claim 8 wherein the microprocessor is further operative to detect a wake-up event indication.

12. The apparatus of claim 11 wherein the microprocessor is further operative to turn on the second clock source in response to the wake-up event indication, and the clock multiplexer is operative to apply the output of the second clock source to the clock input of the microprocessor after a third predetermined delay.

13. The apparatus of claim 11 wherein the wake-up event indication includes an interrupt to the embedded microprocessor.

14. The apparatus of claim 11 wherein the microprocessor is further operative to turn on the system power source, and the clock multiplexer is further operative to switch the clock input of the microprocessor from the second clock source to the first clock source.

* * * * *

UNITED STATES PATENT AND TRADEMARK OFFICE
CERTIFICATE OF CORRECTION

PATENT NO : 5,848,281
DATED : December 8, 1998
INVENTOR(S) : Kenneth George SMALLEY and Ian Fraser HARRIS It is certified that error appears in the above-identified patent and that said Letters Patent is hereby corrected as shown below:

The title page, item 54, and Column 1, line 1, "POWDER" should read:
--POWER--;

Column 2, line 46, "Is" should read:
--is--;

Signed and Sealed this

Twenty-first Day of December, 1999

Attest:

Q. TODD DICKINSON

*Attesting Officer*  *Acting Commissioner of Patents and Trademarks*